E. G. FITZ GERALD.
LOCKING NUT.
APPLICATION FILED FEB. 2, 1915.
1,189,081.
Patented June 27, 1916.
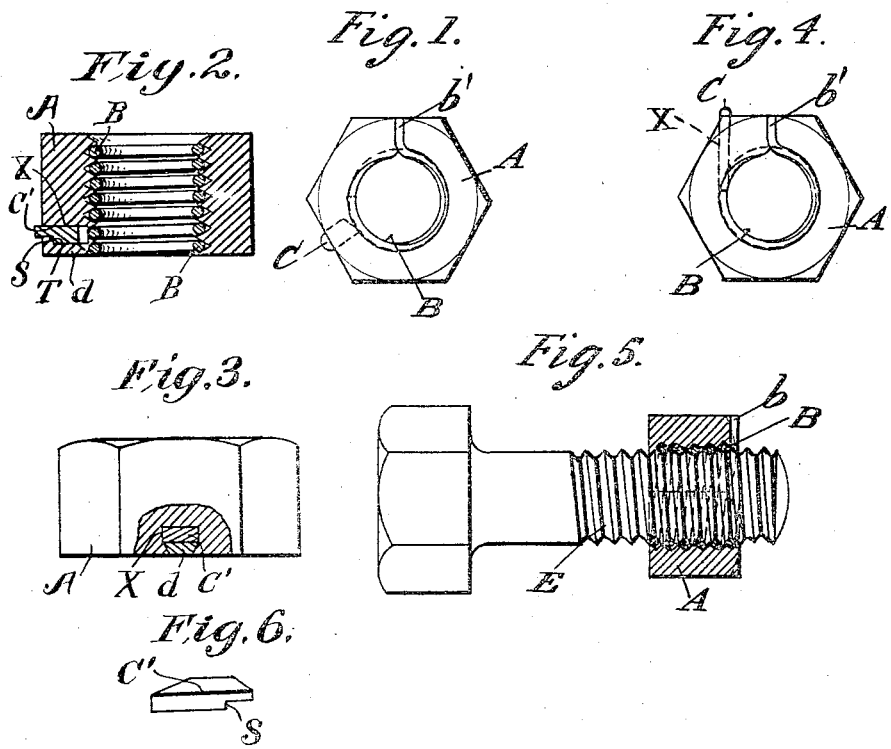

UNITED STATES PATENT OFFICE.

EDWARD GERALD FITZ GERALD, OF LONDON, ENGLAND.

LOCKING-NUT.

1,189,081. Specification of Letters Patent. Patented June 27, 1916.

Application filed February 2, 1915. Serial No. 5,770.

*To all whom it may concern:*

Be it known that I, EDWARD GERALD FITZ GERALD, a subject of the King of Great Britain, residing in London, England, have invented certain new and useful Improvements in Locking-Nuts, of which the following is a specification.

This invention relates to improvements in locking nuts of the type in which a helix of wire is placed in the thread of a nut and fixed thereto at one end, the helix when the nut is screwed home lying between the threads cut in the nut and the bolt and is designed to provide improved means for permitting the unscrewing of the bolt or nut. Nuts and bolts of this type having been once screwed together cannot be unscrewed until the fixed end of the helix of wire is freed, which sometimes causes considerable difficulty, and it is to overcome this objection that the present invention has been devised. Nuts or bolts provided with such helical wire locking arrangements are so constructed that when being screwed together the tendency is to expand or open the helix and so permit the bolt to pass into the nut, but when the effort is made to unscrew them the helix contracts and grips the bolt, preventing the loosening of the nut. The helix, as it contracts to grip the bolt, moves around slightly in the nut and my invention consists essentially in improvements in means adapted, when it is desired to unscrew such a nut, to hold the helix from slipping around in the nut and so prevent it contracting or tightening on the bolt. It has previously been proposed in such nuts to direct the free end of the helix radially outward through a slot in the nut so that it may be engaged by a special form of spanner and be moved sidewise to loosen it, but such a slot is apt to get filled with dirt and prevent the loosening of the helix, and one object of this invention is to avoid this difficulty.

The invention will be fully described with reference to the accompanying drawings.

Figure 1 is a plan view of a nut showing the present invention applied thereto. Fig. 2 is a vertical sectional view taken through Fig. 1. Fig. 3 is an elevation of the nut with a portion broken away to clearly illustrate the application of the plug C. Fig. 4 is a plan view of a nut similar to Fig. 1 showing a slightly different arrangement of the plug C, as contemplated by the present invention. Fig. 5 is a sectional view showing the arrangement of the wire helix on the nut. Fig. 6 is a detail perspective view of the plug C.

One of the simplest forms of the invention is shown in Fig. 1. As in all the forms of the invention the nut A is provided with a helix B of wire which lies in the helical or thread groove formed in the nut in the usual manner (see Fig. 5). One end of the wire helix B is fixed in the nut A in any suitable manner, being, for instance, turned outward as at $b$ and sunk in a groove adapted to receive it, which is formed in the upper face of the nut. A hole is provided in the side of the nut A near the bottom face, that is to say the face opposite to that at which the wire B is fixed, into which a pin C may be inserted so as to engage the wire B and prevent it slipping in the nut A. Such pin may have a pointed or chisel end as shown and may fit tightly in the hole formed in the nut so as to require a slight blow to drive it home.

In a somewhat similar arrangement (see Figs. 2 and 3) the nut may be formed with a hole or recess adapted to receive a pin or lug C' which fits easily therein and the head of which projects slightly beyond the cheek or side of the nut. The pin C' may be held from displacement from the recess X by shoulder S formed on the pin and engageable with the shoulder T in the recess, and is preferably formed with a pointed or chisel end as above described. When it is desired to unscrew the nut an ordinary spanner placed thereon forces the pin into the nut and causes it to engage the helix and prevent it slipping around in the nut, and so prevents it tightening on the bolt, permitting the withdrawal of the nut. To facilitate the application of the pin C' in the recess X, the latter may be formed on the underside of the nut when it is being stamped, and then having a suitable wedge-shaped piece $d$ hammered in after the pin C' has been inserted.

Fig. 4 shows a very similar arrangement to that of Fig. 1 in which a plug C is arranged in the recess X to directly abut the free end $b'$ of the helix B so as to expand the latter when the plug is moved inwardly.

Having thus described the nature of the said invention and the best means I know of carrying the same into practical effect, I claim:—

1. In combination, a nut having a recess therein, a helix of wire inserted in the bore of the nut and having one end secured thereto, a plug fitted in said recess and movable therein, and a sharpened gripping portion formed on the plug and adapted to engage and grip certain of the convolutions of said helix adjacent its free end.

2. In a nut and bolt lock, a nut having an aperture therein, a helix of wire inserted in the bore of the nut and adapted to have its convolutions lie in the threads of the bore, one end of said helix being secured to the nut whereby the helix when the nut is turned in one direction tightens around the bolt, and a plug snugly and movably fitted into said aperture and having its inner end sharpened, said sharpened end being adapted to engage and grip certain of the convolutions of the helix to prevent the latter from tightening on the bolt when it is desired to remove the nut from the bolt.

3. In a nut-and-bolt lock, a nut having an aperture therein, a helix of wire inserted in the bore of the nut and having one end secured thereto, a plug snugly and movably fitted into said aperture, the outer end of said plug extending beyond the outer side of the nut and the inner end thereof being adapted to engage certain of the convolutions of the helix to prevent the latter from tightening on the nut when it is desired to remove the nut from the bolt.

4. In a nut-and-bolt lock, a nut having an aperture therein, a helix of wire inserted in the bore of the nut and adapted to have its convolutions lie in the threads of said bore, one end of the helix being secured to the nut whereby the helix when the nut is turned in one direction tightens around the bolt, and a plug snugly and movably fitted in said aperture and adapted to have its inner end engage certain of the convolutions of the helix to prevent the latter from tightening on the bolt when it is desired to remove the nut from the bolt.

In testimony whereof I have signed my name to this specification in the presence of two subscribing witnesses.

EDWARD GERALD FITZ GERALD.

Witnesses:
JOSEPH MILLARD,
WALTER J. SKERTEN.